Figure 1:
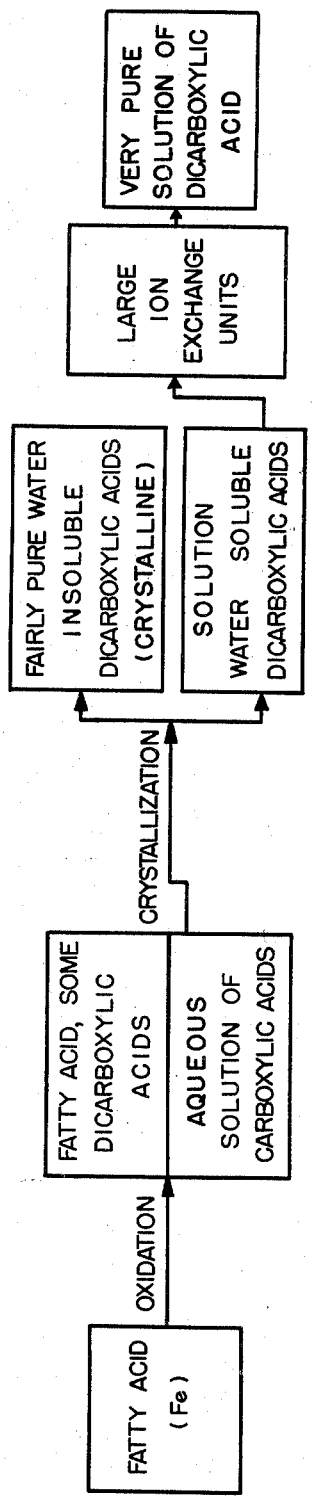

2,858,336
TREATMENT OF FATTY ACIDS

Norman C. Hill, Akron, Ohio, and Vincent P. Kuceski, Park Forest, Ill., assignors to The C. P. Hall Company, Akron, Ohio, a corporation of Ohio Application August 18, 1954, Serial No. 450,823

4 Claims. (Cl. 260—537)

This invention relates to the treatment of crude fatty acids prior to oxidation to dicarboxylic acids, fatty acids of shorter chain length, etc. The fatty acid must be immiscible with aqueous solvents and therefore must have a chain length of at least 4 carbon atoms. The pretreatment comprises washing a metal-contaminated crude fatty acid of such chain length with an aqueous mineral acid, such as, for example, nitric acid, sulfuric acid, hydrochloric acid or phosphoric acid to dissolve out water-soluble metal salts and convert metallic compounds such as metal soaps, etc. into water-soluble salts and remove them from the crude fatty acid.

By "fatty acid" herein we refer to both saturated and unsaturated carboxylic acids. The pre-treatment is applicable only to the relatively water-insoluble fatty acids which are fatty acids containing 4 or more carbon atoms up to, for example, 18 or 22 or more. The crude fatty acid may be red oil, stearic acid or other fatty acid of the animal fatty acid group, cocoanut fatty acids, cottonseed fatty acids and other seed oil fatty acids of the vegetable oil group, fatty acids derived from the foots from various sources, fish oil fatty acids, hydrogenated fatty acids, tall oil fatty acids, and fatty acids from synthetic sources such as those derived from petroleum, as well as those obtained from the Oxo and Fischer-Tropsch operations, etc. The fatty acids, and particularly those derived from the Oxo and Fischer-Tropsch and and similar operations, may be treated while admixed with alcohols, aldehydes, ketones, monocarboxylic acids, esters, ethers and hydrocarbons immiscible with water, and mixtures thereof, and subsequently be subjected in such admixtures to nitric acid oxidation and conversion to monocarboxylic or dicarboxylic acids. The fatty acids occurring in nature are largely saturated and unsaturated fatty acids of 16 and 18 carbon atoms, but fatty acids containing 12 and 14 carbon atoms are relatively abundant. Fatty acids of longer and shorter chain lengths, including erucic or behenic acids as well as butyric acid are capable of treatment according to this process. These acids in crude form, particularly after splitting from the glycerides or obtained from synthetic sources or after shipping in tank cars, etc. or after prolonged storage include iron or other metal in some form as a contaminant such as soda from foots, iron from contamination from containers, tanks and other sources.

A principal process for conversion of fatty acids to carboxylic acids of shorter chain lengths and to dicarboxylic acids, is with nitric acid, nitrous acid, or an oxide of nitrogen higher than $N_2O$, which process may involve the use of air or the process may be carried out in the substantial absence of air. Chromic acid oxidation, and permanganate oxidation also have been used extensively, as well as ozonization. In all such operations metal contaminants are objectionable, some objection being to their presence during the oxidation, and in any event, their presence in the final product being objectionable, particularly where the production of relatively pure carboxylic acids is desired. Thus, iron salts, if present in any substantial concentration are objectionable because they discolor the resultant acids.

When fatty acid is oxidized to monocarboxylic acids of shorter chain length and to dicarboxylic acids, a good part of the lower dicarboxylic acids formed are water soluble and remain soluble in the aqueous oxidizing medium. Metals present in the fatty acid pass into the aqueous phase. These metals are then very difficult to remove, since the lower dicarboxylic acids themselves are quite soluble and cannot be easily freed of the metal salts by crystallization methods. We have found, however, that we can remove the metal salts from the acid solution by ion exchange as described in U. S. application Serial No. 450,822, filed August 18, 1954. Although this is a very good method, the high percentage of metal salts which have to be removed necessitates an excessively large ion exchange unit or frequent regeneration cycles. In order to reduce the cost of removing the metal ions and to eliminate such hard-to-remove ions as sodium, and to effectively realize other advantages which will become readily apparent, the method of this invention was developed.

The preferred mineral acid for the pre-treatment of the fatty acid is nitric acid. The nitric acid must contain sufficient water to form two phases with the fatty acid at the temperature of the pre-treatment. This dilute acid may, for example, have a concentration of 5 to 35 percent nitric acid and should be of sufficiently different specific gravity from the fatty acid to permit efficient separation by gravity. There are several advantages in using nitric acid. If the subsequent oxidation is to be a nitric acid oxidation, any nitric acid dissolved into the fatty acid is not wasted. In such oxidations any nitric acid which is dissolved into the fatty acid, or reacts therewith, separates from the water with which it is present in the dilute aqueous state and does not have to be recovered from the aqueous wash but is used in the subsequent oxidation.

Nitric or hydrochloric acid is used in the pre-treatment rather than sulfuric or phosphoric acid because the nitric or hydrochloric acid may be distilled and recovered for reuse.

Although the pre-treatment may be carried out as a batch operation, it is preferably conducted as a countercurrent wash in which the heavier aqueous material is added near the top of a tower containing the liquid fatty acid. The tower may be sufficiently high so that the dilute acid in one passage through the tower will accomplish the same removal of metals as several batch washes.

If nitric acid is used for the pre-treatment the temperature should be such as not to effect any objectionable oxidation of the fatty acid to water-soluble products. Temperatures at which the nitric acid may add to the fatty acid, either at the double bond or elsewhere, will require more nitric acid in the pre-treatment, but this will result in the use of correspondingly less nitric acid to effect the oxidation operation. On the other hand, the temperature of the fatty acid must be high enough to maintain the fatty acid in a sufficiently fluid condition to be efficiently washed by the aqueous nitric acid. For red oil this normally will be not less than 40° C., nor higher than 85° C. when nitric acid of about 25 percent is employed. For higher concentrations lower upper limits of temperatures will be used. The temperature employed will be dependent upon a number of factors, including the time permitted for removal of the metal contaminant, whether or not there is agitation, etc. If acids of lower concentration are employed there will be less tendency for objectionable reactions with the fatty acid. The degree of saturation of the crude fatty acid will influence the reaction of the nitric acid therewith, and higher degrees of unsaturation will normally indicate the use of lower temperatures.

The following example is illustrative of the invention:

As an example, a red oil batch which analyzes 0.35 percent ash was washed with an equal weight of 25 percent nitric acid at 80–90° C. The ash was largely iron compound. The washed red oil was lighter in color, and upon ignition gave an ash of only 0.022 percent. When the red oil was similarly washed a second time the resultant ash was 0.012 percent. Thus the ash had been reduced by 96.5 percent.

On oxidation of the washed red oil by nitric acid to monocarboxylic and dicarboxylic acids which are soluble in the aqueous phase, the metal nitrates in the aqueous reaction mixture are sufficiently low to yield acids relatively free from metal contaminants.

Figure 2:
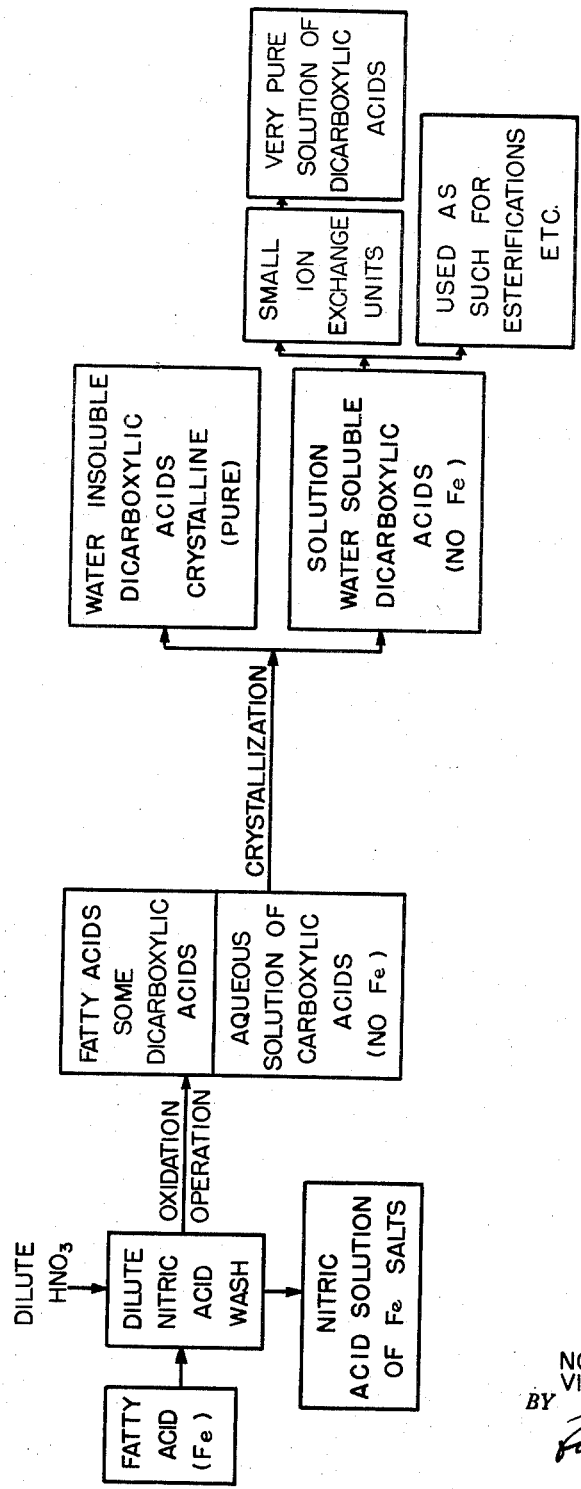

Figures 1 and 2 of the drawings are flow sheets which compare the results of the oxidation process, with and without the pre-treatment. The drawings refer to "Fe" as the metal contaminant, because generally it will be largely derived from equipment, containers, etc. of high iron content. It is easily removed by the pre-treatment and this is advantageous regardless of the treatment of the oxidation product, if indeed it is subjected to any treatment. As illustrative of such subsequent treatment, Figure 1 illustrates that if there is no pre-treatment of the fatty acid larger ion exchange equipment is required than if there is such pre-treatment. Figure 2 also indicates the possibility of using the oxidation product directly.

The advantage of this method of washing the red oil with nitric acid before oxidation was now immediately apparent, since a given amount of cationic exchange resin was now able to purify five to ten times the amount previously purified. Furthermore, sodium salts, which are sometimes found in red oil, and which are relatively hard to remove by ion-exchange as compared to metals of higher valence, are substantially removed by the pre-treatment and the oxidation product is therefore substantially sodium free.

The advantage of this is the fact that the metal contaminants are removed from the starting material. Thus, the metallic soaps and complexes of red oil and metallic salts and complexes of the unsaponifiable matter are converted to the very soluble mineral salts and extracted easily with a nitric acid solution, before the oxidation begins. This leaves the red oil comparatively free of metal contaminants. When the red oil is then converted to carboxylic acids by oxidation, the aqueous phase containing the carboxylic acids is substantially free of metal contaminants.

What we claim is:

1. The method of oxidizing fatty acids of a chain length of at least 4 carbon atoms and containing a substantial amount of iron contaminant, which comprises washing the fatty acid at a temperature at which it is liquid, in aqueous nitric acid solution immiscible with the fatty acid and thereby producing a two-phase mixture and dissolving the iron into the water phase as iron nitrate, and then oxidizing the fatty acid which contains nitric acid from the wash with an oxidizing agent of the class consisting of nitric acid, nitrous acid and oxides of nitrogen higher than $N_2O$, and producing therefrom dicarboxylic acid which is substantially free of iron contaminant.

2. The method of oxidizing fatty acids of a chain length of at least 4 carbon atoms and containing a substantial amount of iron and sodium contaminants, which comprises washing the fatty acid at a temperature at which it is liquid, in aqueous nitric acid solution immiscible with the fatty acid and thereby producing a two-phase mixture and dissolving the iron and sodium contaminants into the water phase as iron and sodium nitrates, and then, without removing nitric acid dissolved in the fatty acid, oxidizing the fatty acid with an oxidizing agent of the class consisting of nitric acid, nitrous acid and oxides of nitrogen higher than $N_2O$, and producing therefrom dicarboxylic acid which is substantially free of iron and sodium contaminants.

3. The method of oxidizing fatty acids of a chain length of at least 4 carbon atoms and containing a substantial amount of sodium contaminant, which comprises washing the fatty acid at a temperature at which it is liquid, in aqueous nitric acid solution immiscible with the fatty acid and thereby producing a two-phase mixture and dissolving the sodium contaminant into the water phase as sodium nitrate, and then, without removing nitric acid dissolved in the fatty acid, oxidizing the fatty acid with an oxidizing agent of the class consisting of nitric acid, nitrous acid and oxides of nitrogen higher than $N_2O$, and producing therefrom dicarboxylic acid which is substantially free of sodium contaminant.

4. The process of treating red oil which is contaminated with an iron salt which comprises washing the red oil by countercurrent flow with aqueous nitric acid of substantially 25 percent concentration at a temperature of about 40 to 85° C. thereby dissolving at least some of the iron salt from the red oil, and then without removing nitric acid remaining in the red oil, oxidizing the red oil with further nitric acid and producing dicarboxylic acid therefrom.

References Cited in the file of this patent

UNITED STATES PATENTS

| | | |
|---|---|---|
| 2,203,680 | Ellingboe | June 11, 1940 |
| 2,365,290 | Price | Dec. 19, 1944 |
| 2,413,009 | Taussky | Dec. 24, 1946 |
| 2,610,974 | Nelson | Sept. 16, 1952 |
| 2,658,906 | Pace | Nov. 10, 1953 |
| 2,716,133 | Pooler | Aug. 23, 1955 |
| 2,721,205 | Pace | Oct. 18, 1955 |